Aug. 14, 1951

E. H. PITNEY 2,564,231

LIQUID LEVEL MAINTAINER

Filed June 6, 1949

INVENTOR
EARL H. PITNEY
BY G. H. Braddock
ATTORNEY

Patented Aug. 14, 1951

2,564,231

UNITED STATES PATENT OFFICE 2,564,231

LIQUID LEVEL MAINTAINER

Earl H. Pitney, Minneapolis, Minn.

Application June 6, 1949, Serial No. 97,461

7 Claims. (Cl. 137—68)

This invention has relation to a device for employment in connection with a liquid circulating system to maintain the level of liquid to be circulated substantially constant, thus to constantly maintain in the system a substantially fixed quantity of the liquid.

The liquid level maintainer herein illustrated and described incorporates a construction and arrangement including a vessel providing an airtight container for reserve liquid and a housing providing a sealing and timing chamber and wherein said airtight container and housing are associated with each other and with a liquid circulating system in such manner as to be capable of constantly controlling the amount of liquid to be circulated in said system, thus to maintain the level of the liquid in the circulating system substantially constant. There is provision for gravity flow of reserve liquid from the airtight container by way of the sealing and timing chamber into the liquid circulating system and for force flow of liquid of said circulating system through said sealing and timing chamber, and instrumentalities in the sealing and timing chamber have relation to each other and to the circulating system and airtight container to cause gravity flow of liquid from said airtight container into said circulating system to occur whenever the level of liquid in the circulating system is below a predetermined level upon cessation of said force flow of liquid and to cause flow of liquid from the airtight container into said circulating system to cease when the level of liquid in the circulating system is at or reaches said predetermined level.

While the principles of the present invention are applicable to many different uses, as, for example, to maintain the level of lubricating oil in the crankcase of an engine of any type substantially constant, the new and improved liquid level maintainer is herein illustrated and described as when applied to an ordinary automotive vehicle internal combustion engine to maintain the level of lubricating oil in its crankcase at a predetermined, substantially constant level.

Figure 1:
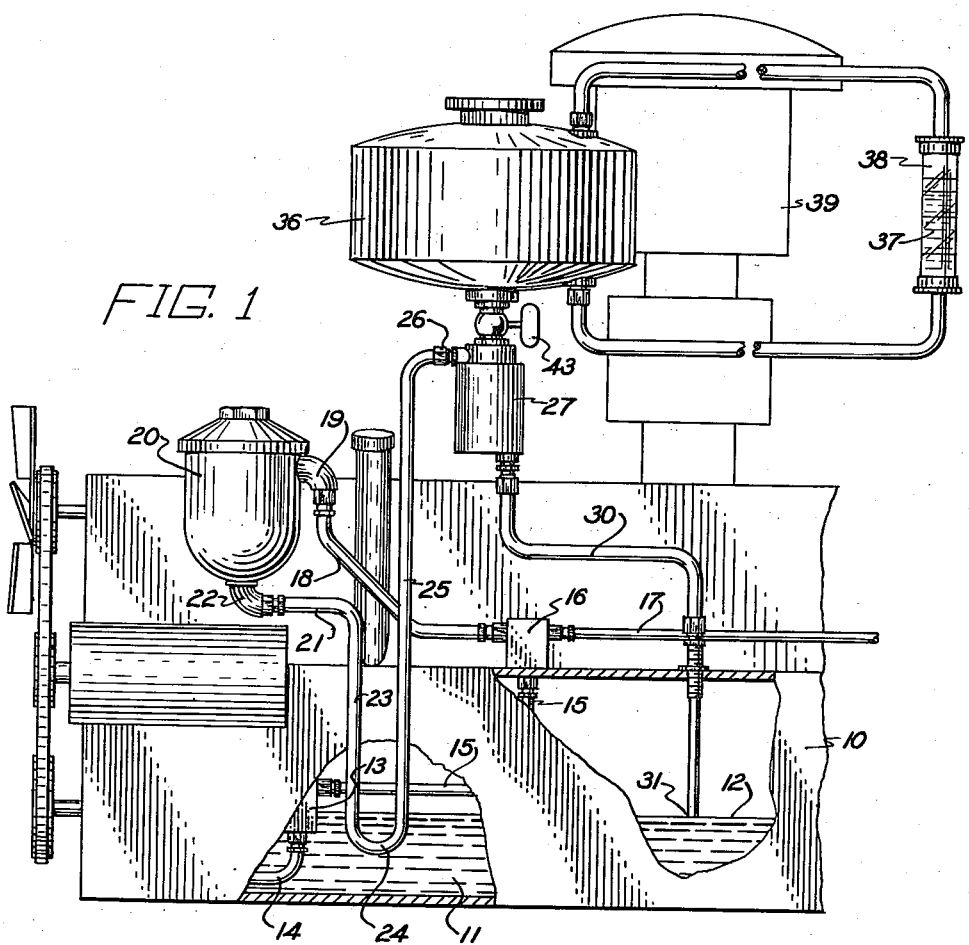
Figure 2:
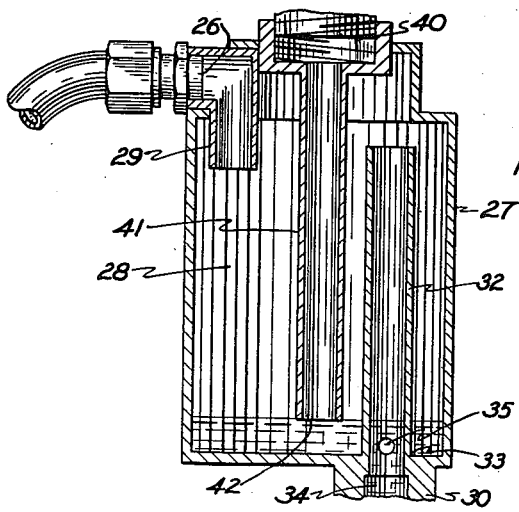

In the accompanying drawing forming a part of this specification,

Fig. 1 is a side elevational view, partially in section and partially broken away, of a liquid level maintainer made according to the invention as when applied to use; and Fig. 2 is an enlarged vertical sectional view of a housing providing a sealing and timing chamber of the liquid level maintainer.

With respect to the drawing and the numerals of reference thereon, 10 denotes the crankcase of an internal combustion engine of an automotive vehicle, and 11 indicates lubricating oil in said crankcase filling the crankcase up to a level, represented 12, which is a predetermined level for the lubricating oil in the disclosure as made.

The crankcase lubricating oil will be circulated in a well known manner by a pressure lubricating system of the internal combustion engine. As disclosed, a pump 13 for accomplishing circulation of the lubricating oil is situated in the crankcase, a pipe connection to said pump being indicated at 14 and a pipe connection from the pump being designated at 15. The pipe connection 15 leads to a sending unit 16 of oil pressure gauge mechanism of the internal combustion engine, and pipe connections, represented 17 and 18, respectively, lead from said unit or mechanism 16. The pipe connection 17 may lead to an oil pressure gauge (not shown). The pipe connection 18 leads, at 19, into an upper portion of an oil cleaner 20, and a pipe connection 21 leads, at 22, from a lower portion of said oil cleaner. The unit or mechanism 16 and the oil cleaner 20 are situated outside of the crankcase 10, as is also the pipe connection 21, and said pipe connection 21 is of U-shape, including a first arm 23 extending downwardly from said oil cleaner to a position below the level of oil in said crankcase (to prevent syphoning), a base portion 24 into which said first arm 23 merges and a second arm 25 extending upwardly from the base portion. The upper end of the second arm 25 opens, at 26, to an upper portion of a housing 27 providing a sealing and timing chamber 28 of the liquid level maintainer. A nipple 29 directs oil into the sealing and timing chamber 28.

A pipe connection 30 leads downwardly from a lower portion of the housing 27 into the crankcase 10, and the lower end 31 of said pipe connection 30 terminates at the predetermined level 12 of oil in said crank case. An upstanding conduit 32 in the sealing and timing chamber 28 has its lower end 33 secured to a lower portion of the housing 27 about a passageway 34 through the pipe connection 30 in such manner as to preclude travel of oil from the chamber 28 to said pipe connection 30 save by way of the upstanding conduit 32, and a bleeder orifice, in a lower portion of said upstanding conduit affording communication between a lower portion of said chamber 28 and the passageway of the upstanding conduit, is denoted 35.

Obviously, there will be circulation of lubricating oil in response to operation of the pump 13, travel of oil from and back to the crankcase being from the pump through the pipe connection 15 to the unit or mechanism 16, thence through the pipe connection 18 to the oil cleaner 20, thence through the pipe connection 21 to the sealing and timing chamber 28, and thence by way of the upstanding conduit 32 and/or its bleeder orifice 35 through the pipe connection 30.

A vessel 36 providing an airtight container for reserve lubricating oil 37 is suitably and conveniently supported at elevation above the housing 27, and a gauge for reading the level of lubricating oil in said vessel 36 is represented at 38. As disclosed, the vessel 36 is at about the elevation of a usual air cleaner 39 of or for the internal combustion engine.

An outlet 40 from a lower portion of the vessel 36 opens to the upper end of a passageway through a downwardly extending conduit 41 in the sealing and timing chamber 28. The downwardly extending conduit 41 is in spaced relation to both the upstanding conduit 32 and the nipple 29, and the lower end 42 of said downwardly extending conduit is disposed above the elevation of the bleeder orifice 35 and below the upper end of said upstanding conduit 32. As disclosed, the lower end of the downwardly extending conduit 41 is disposed only a trifle above the elevation of said bleeder orifice 35, and also is disposed considerably below the elevation of the upper end of the upstanding conduit 32, as well as considerably below the elevation of the location 26 of entrance of the pipe connection 21 to the sealing and timing chamber 28.

A manually operable valve 43, for controlling flow from the vessel 36 into the downwardly extending conduit 41, is situated between said vessel 36 and the housing 27.

It will be evident that flow of reserve lubricating oil from the vessel 36 into the sealing and timing chamber 28 will be precluded when the manually operable valve 43 is in closed position and permitted when said manually operable valve is in open position.

Gravity flow from the vessel 36 to the crankcase 10, when permitted, will be by way of, and only by way of, the downwardly extending conduit 41, the bleeder orifice 35, the portion of the upstanding conduit 32 below said bleeder orifice and the pipe connection 30.

The manner in which the liquid level maintainer is operative to perform its intended service or function will now be described.

The construction and arrangement will be such that when the pump 13 is operative to cause circulaton of lubricating oil in the system, of course through the sealing and timing chamber 28, the flow through said sealing and timing chamber will be of sufficiently great magnitude to insure greater flow than can pass the bleeder orifice 35. Thus there will be built up and constantly maintained, while the pump 13 is in operation, a body of lubricating oil in said sealing and timing chamber above the level of the lower end of the downwardly extending conduit 41, and, obviously, the mentioned body of lubricating oil will effectively seal off the vessel 36 and prevent flow therefrom by way of the downwardly extending conduit 41 into the sealing and timing chamber. More explicitly stated, the major portion of the flow from said sealing and timing chamber, while the pump 13 is operative, will be through the full length of the upstanding conduit 32, and there will be an oil seal about the downwardly extending conduit 41 and its lower end 42 up to the elevation of the upper end of the upstanding conduit 32.

The lubricating oil 11 is disclosed in Fig. 1 of the drawing at its level in the crankcase as when an internal combustion engine with which the liquid level maintainer is assembled is inoperative. The manually operable control valve 43 is open, natural static conditions prevail, and the level of lubricating oil 11 is substantially at the elevation of the lower end of the pipe connection 30, adapted to function as a gravity feed pipe for flow of reserve lubricating oil into the circulating system, as well as a part of said circulating system itself.

As hereinbefore stated, there will be no flow of reserve oil into the circulating system while the pump 13 is operative. Upon cessation of operation of said pump, however, there will be equalizing flow of lubricating oil, by way of the bleeder orifice 35, causing the lubricating oil in the crank case 10 to reach the elevation of the lower end of the pipe connection 30. In any instance when an operation of the internal combustion engine causes no appreciable amount of oil to be consumed, when operation of the engine closes lubricating oil will itself be sufficient to raise the lubricating oil level in the crankcase to the elevation of the lower open end of the pipe connection 30 and at the same time maintain the level of lubricating oil in the sealing and timing chamber 28 at or above the elevation of the lower end of the downwardly extending conduit 41. In any instance when an operation of said internal combustion engine causes an appreciable amount of oil to be consumed, when operation of the engine ceases lubricating oil will flow by gravity, by way of the bleeder orifice 35 and the pipe connection 30, from the sealing and timing chamber 28 into the crankcase until the oil level in said crankcase reaches the predetermined level 12, and concurrently there will be flow of reserve lubricating oil 37 from the vessel 36 by way of the downwardly extending conduit 41 into said sealing and timing chamber until the oil level in the sealing and timing chamber reaches substantially the level of the lower end of said downwardly extending conduit. That is, there will be concurrent flow from the vessel 36 into the sealing and timing chamber and from said sealing and timing chamber into the crankcase whenever the level of oil in said crankcase is below the predetermined level, the pump 13 being inoperative, and when the level of oil in the crankcase reaches the predetermined level, the level of oil in the sealing and timing chamber will be at or have reached the elevation of the lower end of the downwardly extending conduit 41. Cessation of flow of oil into the sealing and timing chamber from the vessel 36 and out of said sealing and timing chamber into the crankcase 10 desirably will occur substantially at the same time. In any instance when an operation of the internal combustion engine causes no appreciable amount of oil to be consumed, lubricating oil 11 will reach the predetermined level 12 in the crankcase before lubricating oil in the chamber 28 will have fallen below the level of the lower end of the downwardly extending conduit 41. In any instance when an operation of the internal combustion engine causes an appreciable amount of oil to be consumed, lubricating oil 37 will flow by gravity from the vessel 36 into the lubricating system until there is equalization of flow in the manner as set forth. It will be apparent that the elevation at which the lower open end of the pipe connection 30 is set predetermines the level of lubricating oil in the crankcase 10 when static conditions prevail.

The construction and arrangement desirably will be such that flow of lubricating oil from the sealing and timing chamber 28 to the crankcase will cease substantially at the time the whole of the body of lubricating oil in said crankcase reaches its static condition. Stated otherwise, the bleeder orifice 35 can be of size to insure that static condition of the liquid level maintainer is reached at the same moment the lubricating oil in the circulating system reaches its static condition.

What is claimed is:

1. The combination with a retainer for liquid constituted as a part of a circulating system adapted to be operative to cause liquid to be removed from and returned to said retainer, of a device for maintaining the level of liquid within said retainer at a predetermined, substantially constant level constituted as an airtight vessel for reserve liquid above the elevation of said retainer, a housing providing a sealing chamber below the elevation of and adapted to receive liquid by gravity flow from said vessel, a pipe connection leading downwardly from said sealing chamber and opening to said retainer substantially at the elevation at which the level of liquid in said retainer is to be maintained, and means operative in response to operation of said circulating system and including a part of the liquid in the circulating system as a part thereof for providing a liquid seal within said chamber for precluding flow of reserve liquid from said vessel into the sealing chamber.

2. The combination as specified in claim 1, and a valve for controlling flow of liquid from said vessel into said sealing chamber.

3. The combination as specified in claim 1 wherein said liquid seal is effective until the liquid in said retainer reaches substantially a static condition.

4. The combination with a retainer for liquid constituted as a part of a circulating system adapted to be operative to cause liquid to be removed from and returned to said retainer, of a device for maintaining the level of liquid within said retainer at a predetermined, substantially constant level constituted as an airtight vessel for reserve liquid above the elevation of said retainer, a housing providing a sealing chamber below the elevation of and adapted to receive liquid by gravity flow from said vessel, a pipe connection leading downwardly from said sealing chamber and opening to said retainer substantially at the elevation at which the level of liquid in said retainer is to be maintained, and means operative in response to operation of said circulating system and including a part of the liquid in the circulating system as a part thereof for providing a liquid seal within said chamber for precluding flow of reserve liquid from said vessel into the sealing chamber, liquid in said retainer when at said predetermined level being adapted to provide a liquid seal precluding flow of liquid from said sealing chamber into the retainer.

5. The combination with a retainer for liquid constituted as a part of a circulating system also including a pump, an outlet pipe connection for flow of liquid from said retainer in response to operation of said pump and an inlet pipe connection for flow of liquid back to said retainer, of a device for maintaining the level of liquid within said retainer at a predetermined, substantially constant level comprising a housing situated above the elevation of said retainer and providing a sealing chamber constituted as a part of said circulating system, said outlet pipe connection leading into said sealing chamber and said inlet pipe connection leading out of a lower portion of the sealing chamber, an airtight vessel for reserve liquid above the elevation of said housing, said sealing chamber being adapted to receive reserve liquid by gravity flow from said vessel and said inlet pipe connection opening to said retainer substantially at the elevation at which the level of liquid in the retainer is to be maintained, an open ended upstanding conduit in said sealing chamber in contiguous relation to said inlet pipe connection and having a bleeder orifice in its lower portion, said upstanding conduit precluding flow of liquid from said sealing chamber to said inlet pipe connection save by way of its open upper end or said bleeder orifice, and an open ended downwardly extending conduit contiguous with said vessel and opening to said sealing chamber at elevation below the open upper end of said upstanding conduit and above said bleeder orifice.

6. The combination as specified in claim 5, and a valve for controlling flow of liquid from said vessel into said sealing chamber.

7. The combination as specified in claim 5 wherein said outlet pipe connection opens to said sealing chamber substantially at the elevation of the open upper end of said upstanding conduit and the open lower end of said downwardly extending conduit opens to the sealing chamber at an elevation a trifle above the bleeder orifice and considerably below said open upper end of the upstanding conduit.

EARL H. PITNEY.

REFERENCES CITED

The following references are of record in the file of this patent:

UNITED STATES PATENTS

| Number | Name | Date |
| --- | --- | --- |
| 1,230,658 | Brace | June 19, 1917 |
| 1,465,167 | Miller | Aug. 14, 1923 |